United States Patent [19]

Dragone

[11] Patent Number: 5,136,671
[45] Date of Patent: Aug. 4, 1992

[54] OPTICAL SWITCH, MULTIPLEXER, AND DEMULTIPLEXER

[75] Inventor: Corrado Dragone, Little Silver, N.J.

[73] Assignee: AT&T Bell Laboratories, Murray Hill, N.J.

[21] Appl. No.: 748,131

[22] Filed: Aug. 21, 1991

[51] Int. Cl.$^5$ .............................................. G02B 6/26
[52] U.S. Cl. ....................................... 385/46; 385/17; 385/37; 385/39
[58] Field of Search ...................... 385/46, 17, 37, 16, 385/42–45, 39

[56] References Cited

U.S. PATENT DOCUMENTS

| | | | |
|---|---|---|---|
| 4,566,753 | 1/1986 | Mannschke | 385/46 |
| 4,726,644 | 2/1988 | Mathis | 385/46 X |
| 4,896,934 | 1/1990 | Arthins et al. | 385/46 X |
| 4,904,042 | 2/1990 | Dragone | 350/96.15 |
| 5,002,350 | 3/1991 | Dragone | 385/24 |
| 5,039,993 | 8/1991 | Dragone | 350/96.16 |

OTHER PUBLICATIONS

K. Okamoto et al., "Design and Fabrication of Integrated-Optic ...", Electronics Letters, Apr. 25, 1991, vol. 27, No. 9, pp. 774–775.
C. Dragone, "Efficient N×N Star Coupler Based On Fourier Optics", Electronics Letters, Jul. 21, 1988, vol. 24, No. 15, pp. 942–943.
N. Takato et al., "Silica-Based Single-Mode Waveguides on Silicon ...", IEEE Jour. of Lightwave Tech., vol. 6, No. 6, Jun. 1988, pp. 1003–1009.
A. R. Vellekoop et al., "Four-Channel Integrated-Optic Wavelength Demultiplexer ...", Jour. of Lightwave Tech., vol. 9, No. 3, Mar. 1991, pp. 310–314.
M. K. Smit, "New Focusing and Dispersive Planar Component Based ...", Electronics Letters, vol. 24, No. 7, Mar. 31, 1988, pp. 385–386.
C. H. Henry et al., "Glass Waveguides on Silicon for Hybrid Optical Packaging", Jour. of Lightwave Tech., vol. 7, No. 10, Oct. 1989, pp. 1530–1539.
H. Takahashi et al., "Arrayed-Waveguide Grating for Wavelength Division ...", Electronics Letters, vol. 26, No. 2, Jan. 18, 1990, pp. 87–88.
J. B. D. Soole et al., "Monolithic InP-Based Grating Spectrometer ...", Electronics Letters, vol. 27, No. 2, Jan. 17, 1991, pp. 132–134.
H. Takahashi et al., "Multi/Demultiplexer for Nanometer-Spacing WDM ...", Paper PD-1, Integrated Photonics Research Conference, Apr. 1991, Monterey, Calif.
C. Dragone, "Efficiency of a Periodic Array with Nearly Ideal Element Pattern", IEEE Photonics Tech. Ltrs., vol. 1, No. 8, Aug. 1989, pp. 238–240.
C. Dragone et al., "Efficient Multichannel Integrated Optics Star Coupler on Silicon", IEEE Photonics Tech. Ltrs., vol. 1, No. 8, Aug. 1989, pp. 241–243.
J. Lipson et al., "A Six-Channel Wavelength Multiplexer and Demultiplexer ...", Jour. of Lightwave Tech., vol. LT-3, No. 5, Oct. 1985, pp. 1159–1163.
C. Dragone, "Optimum Design of a Planar Array of Tapered Waveguides", J. Opt. Soc. Am. A, vol. 7, No. 11, Nov. 1990, pp. 2081–2093.

Primary Examiner—John D. Lee
Assistant Examiner—Phan Thi Heartney
Attorney, Agent, or Firm—Eugene S. Indyk

[57] ABSTRACT

An N×N integrated optical interconnection apparatus capable of switching, multiplexing, or demultiplexing a large number of input and output wavelength channels achieves low levels of crosstalk and insertion loss. Two substantially identical N×M star couplers are connected by an optical diffraction grating comprising M unequal length waveguides spaced from one another by predetermined amounts. Each coupler comprises a dielectric slab defining a free space region between two periodic arrays of waveguides, each radially directed toward a virtual focal point. The arrays are configured so that their respective foci are located at a predetermined distance away from and outside the free space region to minimize phase errors caused by mutual coupling between adjacent waveguides. Specifically, the focal point of each array connected to each star coupler may be located so that it coincides with the phase center of the other array connected to each coupler. Residual phase errors may be reduced by appropriately setting the lengths of the waveguides in the optical grating between the two star couplers. The length difference between any two adjacent waveguides in the grating is not constant throughout the grating.

8 Claims, 9 Drawing Sheets

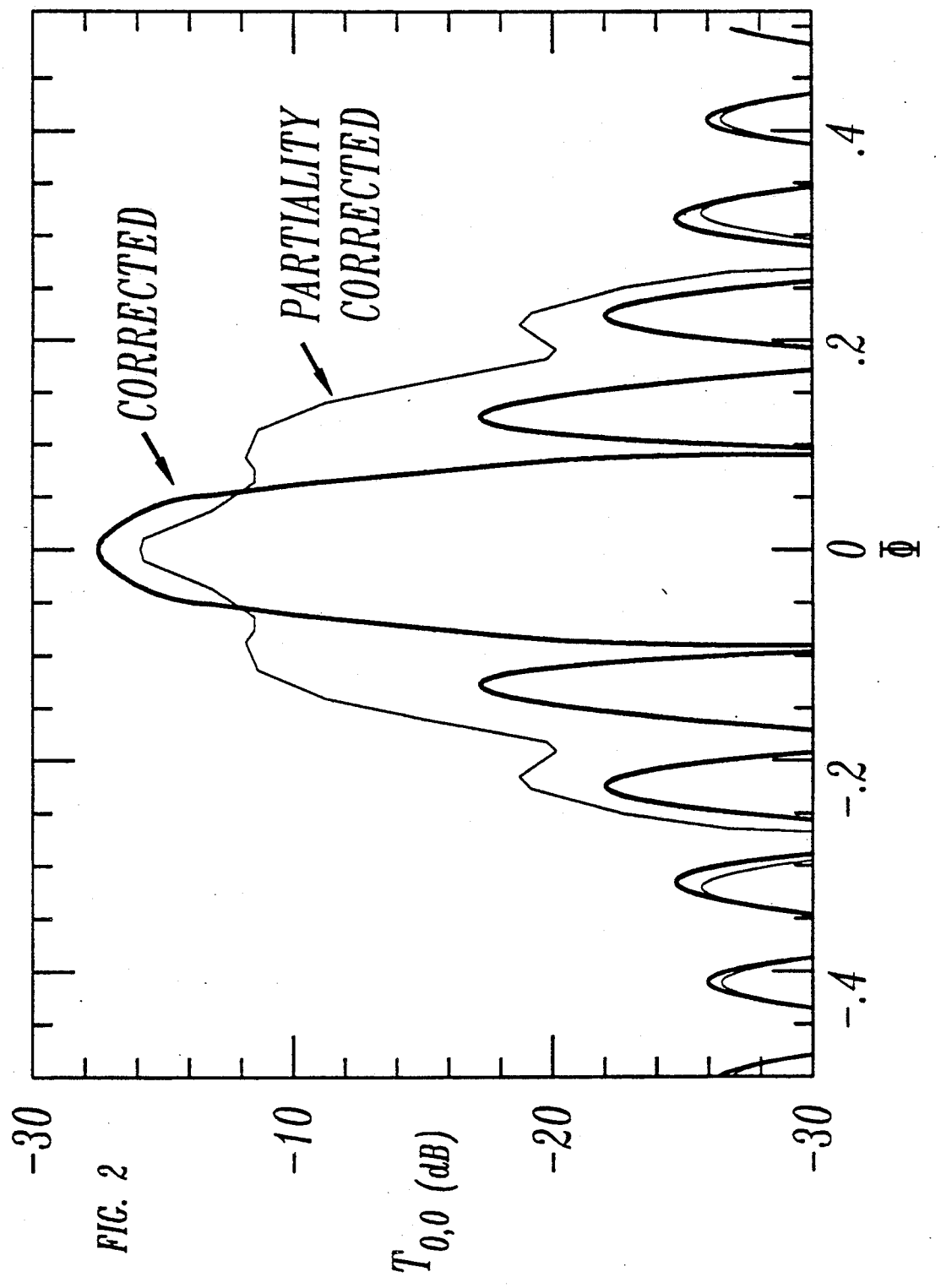

OPTICAL SWITCH, MULTIPLEXER, AND DEMULTIPLEXER

FIELD OF THE INVENTION

This invention relates to an optical interconnection apparatus which is capable of optical switching, multiplexing, and demultiplexing functions. More particularly, this invention relates to correction of aberrations caused by mutual coupling in waveguide arrays used in optical switches, multiplexers, and demultiplexers.

BACKGROUND OF THE INVENTION

Optical switching, multiplexing, and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler, the outputs of which form the outputs of the switching, multiplexing, and demultiplexing apparatus. See, for example, U.S. Pat. No. 5,002,350.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port.

In order to achieve high efficiency power transfer between a relatively large number of input ports and a relatively large number of output ports, the input and output waveguides connected to the star couplers must be closely spaced in the vicinity of the star couplers. This causes a significant degree of mutual coupling between those adjacent input and output waveguides, producing increased undesirable crosstalk between the channels of the device and decreased efficiency in transferring optical power from selected input ports to selected output ports of the apparatus.

It is, therefore, an object of this invention to reduce the crosstalk created by mutual coupling between adjacent waveguides in an optical switching, multiplexing, and demultiplexing apparatus, while at the same time maintaining efficient power transfer from the inputs to the outputs of the apparatus.

SUMMARY OF THE INVENTION

This object is achieved by an apparatus which has at least one array of radially directed waveguides having a focal point located in a predetermined position with respect to the free space region of an optical star coupler so as to reduce phase errors caused by mutual coupling between waveguides in the apparatus. Residual phase errors remaining after positioning of the focal point may be reduced by appropriately setting the lengths of waveguides in an optical grating contained in the apparatus.

BRIEF DESCRIPTION OF THE DRAWINGS

FIG. 2 shows one period $\Lambda$ of the wavelength response of a fully corrected and a partially corrected apparatus like the one in FIG. 1, namely, the transmission coefficient of the path from the central input port to the central out port $T_{0,0}$ as a function of $\Phi$, the input wavelength normalized with respect to $\Lambda$ and referenced to the wavelength of a transmission peak.

GENERAL DESCRIPTION

Figure 1:
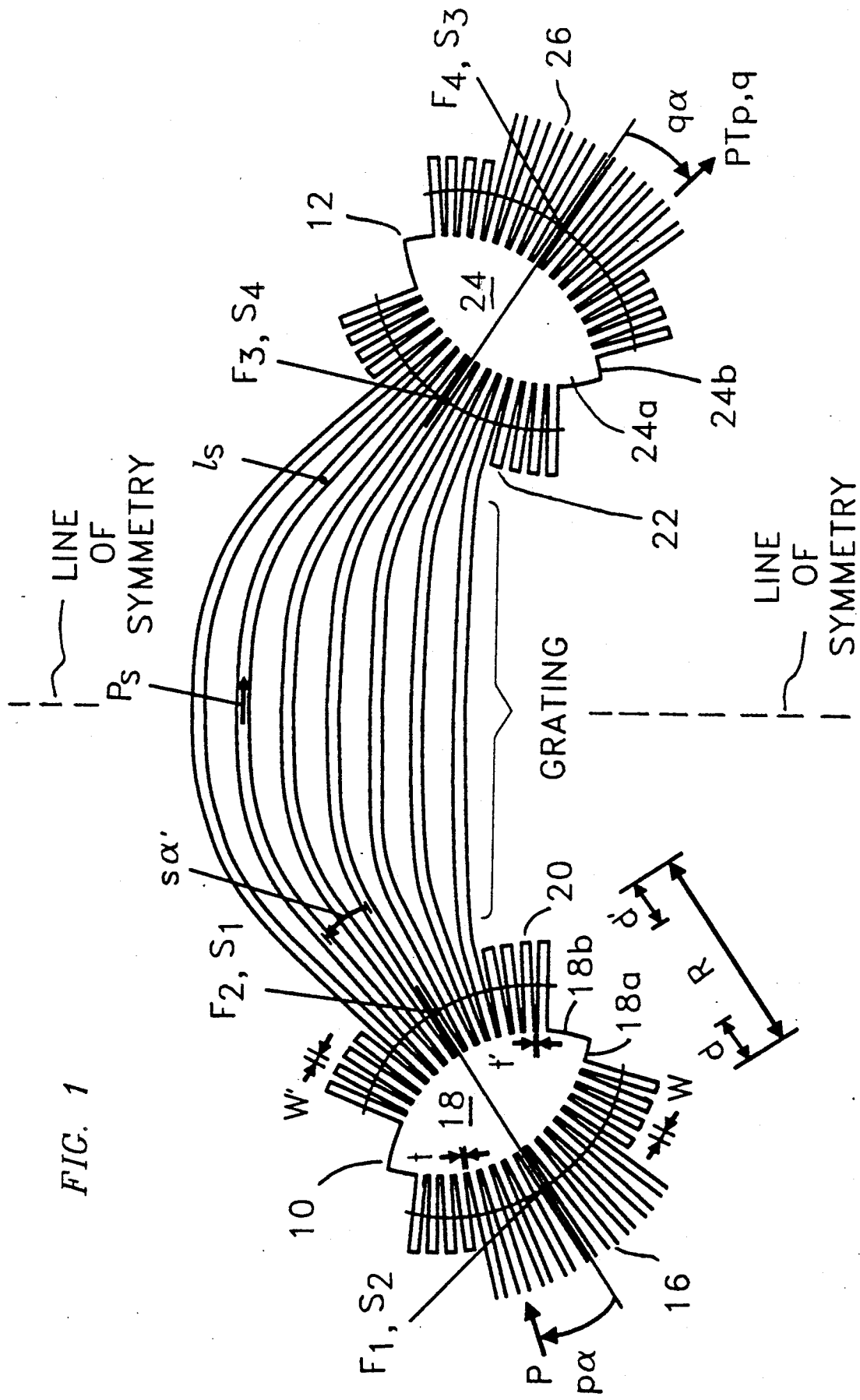
FIG. 1 illustrates an example of an integrated optical switching, multiplexing, and demultiplexing apparatus in accordance with this invention.

FIG. 1 shows an example of an optical interconnection apparatus which can be used as an optical switch, multiplexer, or demultiplexer in accordance with this invention. It preferably comprises two substantially identical and symmetrically disposed star couplers 10 and 12 connected by waveguides forming a substantially symmetrical optical diffraction grating 14.

FIG. 1 shows an array 16 of N input waveguides radially directed from N input ports toward a focal point F2. Each of the input waveguides has a predetermined width W and is angularly displaced from its adjacent waveguides by an angle $\alpha$.

The star coupler 10 comprises a dielectric slab 18 which forms a free space region having two curved, preferably circular, boundaries 18a and 18b. The input waveguides in the array 16 are connected to the free space region 18 in a substantially uniform fashion along boundary 18a. As indicated in FIG. 1, each of those waveguides is separated from its neighbors by a distance t along the boundary 18a.

An array 20 of M output waveguides is radially directed toward a focal point F1. Each of the waveguides in the array 20 has a width W' and is separated from adjacent waveguides in the array 20 by an angular spacing $\alpha'$. The output waveguides in the array 20 are connected to the free space region 18 in a substantially uniform fashion along boundary 18b. Each of the output waveguides is separated from its neighbors at the boundary 18b by a distance t', as shown in FIG. 1.

Figure 1A:
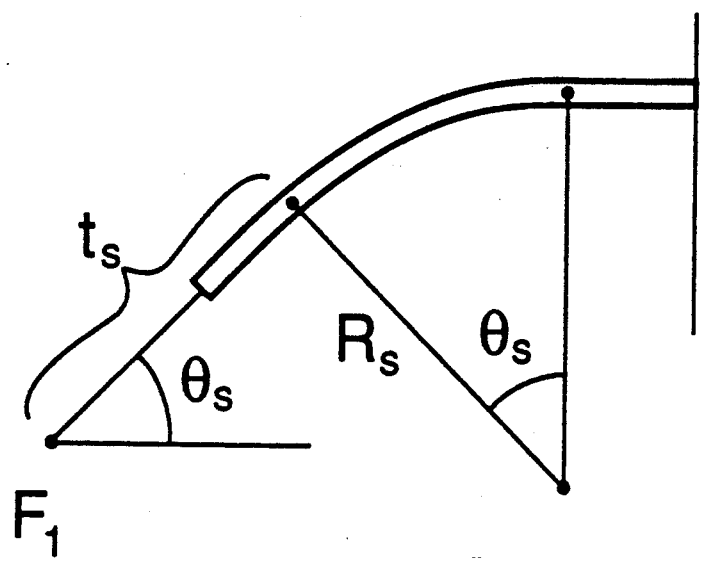
FIG. 1a depicts one-half of one of the waveguides in the optical grating shown in FIG. 1.

The M waveguides of the grating 14 are a symmetric arrangement of waveguides each having length $l_s$, where s is referenced to the central waveguide in the grating. As shown in FIG. 1a, each half of the grating 14 comprises preferably three sections, respectively composed of radial, circular, and equispaced parallel waveguides. The total length of the s-th waveguide is $l_s = 2R_s(\theta_s - \sin\theta_s) + 2t_s(1 - \cos\theta_s) + h_o$ where $h_o$ is a constant and $R_s$ is the s-th radius of curvature.

Each of the output waveguides in the array 20 is connected to the input of a waveguide in the grating 14. The length of each waveguide in the grating differs from the lengths of all the other waveguides in the grating so that is effect predetermined and different phase shifts are applied to optical signals propagating into the waveguides of the grating from the star coupler 10 because of the different path lengths over which the signals in the grating must travel in reaching the output of the grating. The outputs of the waveguides in the grating 14 thus have different phases, which are functions of the lengths of the waveguides.

The outputs of the waveguides in the grating 14 are connected to another array 22 of M input waveguides which are radially directed toward a focal point F4. The array 22 connects the output of the grating 14 to the input of the second star coupler 12. Like star coupler 10, star coupler 12 comprises a slab of dielectric material 24 forming a free space region having two curved, preferably circular, boundaries 24a and 24b. The array 22 of input waveguides is connected to the free space region in a substantially uniform distribution along boundary 24a.

An array 26 of N output waveguides are radially directed from N output ports toward a focal point F3. The output waveguides in the array 26 are connected to the free space region 24 in a substantially uniform distribution along the boundary 24b.

Phase errors caused by mutual coupling between neighboring waveguides in the arrays 16, 20, 22, and 26 cause increased crosstalk and reduced efficiency of power transfer in a device such as the device of FIG. 1. Accordingly, the focal points F1–F4 are located in the specific locations to minimize such phase errors. Specifically, focal point F1 is located at the phase center S2 of array 16, F2 is located at the phase center S1 of array 20, F3 is located at the phase center S4 of array 22, and F4 is located at the phase center S3 of array 26.

A phase center for an array of waveguides such as those arrays shown in FIG. 1 may be considered to be the center of a circle which most closely approximates a locus of points of equal phase for optical wavefronts emitted by the array when the array is excited from a particular input waveguide. In arrays such as those of FIG. 1 having a significant degree of mutual coupling between waveguides, the phase center generally is located outside the free space region a distance d away from the boundary of the free space region. The location of the phase center of an array of radially directed waveguides may be determined using the well known propagating beam method of computing the amplitudes and phase of radiation flowing from waveguides for any given excitation as a function of distance from the waveguides. Preferably, it is assumed that a central waveguide of one of the arrays is excited in the apparatus in FIG. 1. Assuming input excitation is applied to the central waveguide, namely, the waveguide directed through the focal point of the other array of waveguides connected to the same star coupler, the distance d is selected so as to minimize the variation in computed phase along some reference circle centered on that focal point. Various strategies may be adopted regarding this minimization. For example, d may be selected so as to reduce to zero as closely as possible the phase difference of the central waveguide and its two adjacent waveguides. Alternatively, one can select d so that the phase difference between the central and marginal waveguides is minimized. This alternative can be shown to minimize in general the peak value of the phase difference in the entire array.

Once d has been selected in this fashion, there still may be unacceptable residual phase errors across the array of waveguides. These may be reduced by appropriately selecting the length $l_s$ of the arms of the grating, which results in a grating having a nonconstant length difference $l_s - l_{s-1}$ throughout the grating.

The apparatus of FIG. 1 can be used as a switch, a multiplexer, or a demultiplexer. If optical power at a particular wavelength $\lambda_1$ is input to a particular input waveguide or input port in the array 16, the optical input power spreads in the free space region 18 and is distributed to the M waveguides in the grating 14 so that portions of the input optical power travel through each of the M waveguides. Those portions of the input optical power combine in free space region 24 in such a way that as much as possible of that power is concentrated on a desired point along the boundary 24b. This point is selected to be at a desired input of an output waveguide in the array 26 and thereby the input optical power is launched into that selected output waveguide. The location of this concentration of power, and the identity of the output waveguide to which input optical power is directed, is a function of the wavelength of input optical power. Thus, one can select which output waveguide the input power is directed by appropriately setting the wavelength of the input power. The identity of the output waveguide to which input power is directed is also a function of the identity of the input waveguide to which that input power is directed. The apparatus of FIG. 1 can thus switch input optical power from any of the N input waveguides to any of the N output waveguides in the case of a device having N input ports and N output ports.

Notice that the transmission coefficient of the apparatus of FIG. 1 is essentially a periodic function of input wavelength and, in a particular period, it has a single peak of transmission close to unity, produced from a particular input port to a particular output port. If the input and output waveguides are spaced arbitrarily, the apparatus of FIG. 1 is in general characterized in each period by $N^2$ distinct wavelengths of maximum transmission, since $N^2$ is the total number of transmission coefficients corresponding to the various input and output ports. The differences between these wavelengths are determined by the spacing of the input and output waveguides. It is important, for most applications, to choose uniform spacing, so as to cause the above $N^2$ wavelengths to essentially coalesce into N wavelengths $\lambda_1 \ldots, \lambda_N$ of maximum transmission in a particular period. In the following, the device will be assumed to be arranged in this preferred configuration.

If optical input power comprising a plurality of appropriate wavelengths $\lambda_1, \lambda_2, \ldots \lambda_N$ of maximum transmission is introduced simultaneously in one of the input waveguides, each of the wavelengths spreads in free space region of star coupler 10. Portions of the optical power are transmitted through the M waveguides of the grating 14 which then are combined in the free space region of star coupler 12. Optical power of each wavelength is concentrated at the inputs of different output waveguides. Each of the wavelengths of optical input power directed to a single input port thus, is output by the device in different output ports. The device thus can act as a demultiplexer of the plurality wavelengths appearing on one of the input waveguides. The order in which wavelengths appear on the output waveguides is a function of which of the input waveguides carries the plurality of input wavelengths. The order thus can be different when the input wavelengths are directed to a different input waveguides. The device of FIG. 1 thus may be used as an $N \times N$ demultiplexer in the case of a device having N input ports and N output ports.

As mentioned above, the device of FIG. 1 is symmetrical. Therefore, if optical input power at one of a plurality of different input wavelengths $\lambda_1, \lambda_2 \ldots \lambda_N$ is applied to each of the input waveguides, all of the wavelengths can be directed to a single output waveguide. The identity of the output waveguides is a function of the spatial order in which the input wavelengths are applied to the input waveguides and also a function of the magnitude of the wavelengths. The apparatus of FIG. 1 thus may be used as an $N \times N$ multiplexer in the case of a device having N input ports and N output ports.

The location of the focal points of arrays of input waveguides at the phase centers of arrays of output waveguides and vice versa, as described above, reduces crosstalk between the channels of the device and preserves efficient power transfer between selected input ports and selected output ports of the device. This is further improved by an appropriate non-constant path length difference throughout an optical diffraction grating having appropriate length waveguides. The improved switching, multiplexing, and demultiplexing capabilities of the apparatus of FIG. 1 are useful in a wide variety of optical communication systems. These improvements may be utilized in communication systems which carry any kind of optical signals, for example, voice, data, or video signals. They may also be utilized in communication systems of various configurations such as long distance communications systems or local area networks.

The detailed examples of the invention described below reiterate and reinforce the theoretical considerations generally alluded to above in connection with the description of FIG. 1. Additional theoretical considerations are described and the details of calculated and experimental results are reported.

The following discussion of terminology will facilitate understanding the discussion below. FIG. 1 illustrates input optical power P directed to the pth input port. Output optical power $PT_{p,q}$ may be emanating from the qth output port, where $T_{p,q}$ is the transmission coefficient from the pth input port to the qth output port. The values of p and q are referenced to the central input port and central output port, respectively, which, therefore, are the 0th input port and the 0th output port, respectively. The pth input port is angularly displaced from the central input port by an angle $p\alpha$ and the qth output port is angularly displaced from the central output port by an angle $q\alpha$. Optical power $P_s$ flows in the sth waveguide in the optical grating 14. The value of s is referenced to the central waveguide in the grating, namely, the 0th waveguide in the grating. The sth waveguide has a length $l_s$ and is angularly displaced in the vicinity of arrays 20 and 22 from the central waveguide by an angle $s\alpha'$.

DETAILED EXAMPLES OF THE INVENTION

EXAMPLE 1

Described here is an example of a design in accordance with FIG. 1 of a wavelength-selective $N \times N$ integrated multiplexer which can simultaneously multiplex and demultiplex a large number of input and output channels. The wavelength response of the multiplexer is periodic, with period $\Lambda$. In each period, the multiplexer accepts, from each input port, a total of N wavelength channels that are demultiplexed and transmitted efficiently to the N output ports. Similarly, each output port receives, in each period $\Lambda$, N channels, one from each input port. Such a multiplexer can be realized, in accordance with FIG. 1, by means of two $N \times M$ star couplers combined with a lens waveguide consisting of M waveguides of different lengths acting as a diffraction grating between the two couplers. However, as described above, such an arrangement consisting of waveguide arrays is in general afflicted by aberrations, caused by mutual coupling between input and output waveguides or between waveguides connected to the grating. An undesirable consequence of mutual coupling is that some of the input signal intended for a particular output port will, in general, be also transmitted to other ports, thus causing undesirable crosstalk. Another consequence is a reduction of the multiplexer efficiency. It is, of course, possible to reduce mutual coupling by increasing the spacing of the input and output waveguides or the spacing of those waveguides connected to the grating. This, however, will reduce the total number N of channels that can be fitted in a given period $\Lambda$ and it will also reduce the efficiency of the grating, as will become clear from the following discussion. Accordingly, described here are the details of a correction scheme that substantially reduces aberrations caused by mutual coupling, thus allowing nearly ideal wavelength response to be produced, using strongly coupled waveguides.

A multiplexer like the one in FIG. 1 is particularly suitable for realization in integrated form by using SiO$_2$/Si technology. Specifically, the waveguides, star couplers, and optical grating comprise SiO$_2$ regions patterned on an Si substrate, for example, by photolithographic techniques. The multiplexer should be useful for both long haul and local area networks. In a local area network, it allows a large number of receivers and transmitters to be efficiently interconnected. Unlike broadcasting-star configurations, it has no associated 1/N division loss. It is a wavelength routing device whose transfer matrix allows the same wavelength to be used simultaneously at any number of input ports, with the corresponding signals appearing at different output ports. Thus, by employing N tunable lasers, each capable of covering N wavelengths, the multiplexer can also be used as an $N \times N$ switch. Two designs are particularly important.

One design is characterized by the largest possible N for a given grating aperture. This design is very efficient, since most of the signal power applied to any particular input port is transferred to the output ports, and this is obtained, essentially, at all wavelengths in each period $\Lambda$ (free spectral range) of the multiplexer. This multiplexer is, however, afflicted by relatively high levels of crosstalk and, therefore, it may require use of additional input and output filters. The second design, on the other hand, provides very low levels of cross-talk, but it requires a relatively large channel separation, at least twice the channel width. An important feature of this design is its excellent frequency response, whose sidelobes are substantially reduced (to very low levels, of less than −30 dB) by properly optimizing the aperture distribution of the grating. Such a multiplexer, with greatly reduced sidelobes, will be particularly useful when the number of channels N is large, since interference then becomes the most important limitation that determines the largest feasible N.

The multiplexer of FIG. 1 must satisfy two well-known conditions. First, in order for the multiplexer to be efficient, most of the power supplied to each input waveguide must be transferred to the waveguides of the grating. Second, the input waveguides must be located within the central Brillouin zone of the grating. In FIG. 1 the grating is composed of M uncoupled waveguides, connected to radial waveguides having angular spacing $\alpha'$. Therefore, the angular width $2\gamma'$ of the central zone specifying the field of view of the grating is determined by the relation $2\gamma'\alpha' \simeq \lambda/R$ where R is the distance from $F_1$ to $F_2$. In order for the grating to perform efficiently in the above field of view, the radial waveguides of the grating must be strongly coupled in the vicinity of the free-space region.

Furthermore, the grating angular aperture must be large enough to intercept the entire incident power radiated by the input array. That is, $M\alpha'$ must exceed the angular width $2\gamma$ of the field radiated in the free-space region by each input waveguide. The largest value of N for a given M under the above conditions is easily shown to be equal to M, and is obtained when the input and output waveguides are strongly coupled. Then, the radiation pattern of each input waveguide approaches in the free-space region a rectangular pattern, with angular width approximately equal to the width of the central Brillouin zone of the input array. Such a multiplexer, with the largest N, will also have the greatest efficiency. As pointed out later, however, it will also have relatively high sidelobes, produced by its wavelength response. These sidelobes can be reduced substantially, as shown later, by reducing N. In the following, it will be assumed that the two star couplers in FIG. 1 are properly designed, in accordance with the above criteria, so that the power supplied to each input waveguide is efficiently transferred to the M waveguides of the array. A remaining problem, then, is to cause the various wavelength components of this power to be efficiently demultiplexed, with minimal crosstalk caused by mutual coupling.

Each array in FIG. 1 is characterized by two characteristic points, $F_i, S_i$, which are respectively the focal point $F_i$ of its radial lines and the phase center, $S_i$ of radiation produced by exciting the central waveguide of the array. The correction scheme requires that two conditions be satisfied. The first condition optimizes the two star couplers. It is satisfied by designing each coupler so that the phase center of each array connected to the coupler essentially coincides with the focal point of the other array connected to the coupler. The second condition minimizes residual aberrations caused by mutual coupling and it is satisfied by properly choosing the lengths $l_i$ of the M waveguides forming the grating. The purpose of these waveguides is to produce a constant path length difference $l$ between signals propagating in adjacent waveguides of the grating. The appropriate values of $l$ are obtained by optimizing the terminal behavior of the multiplexer at the particular wavelength for which $\beta l = 2\pi J$, where J is the order of the array, and $\beta$ is the propagation constant of the waveguides. At this wavelength, the multiplexer transmission coefficient must be optimized for two particular ports, those corresponding to the central waveguides containing the foci $F_1, F_2$ and $F_3, F_4$ of the two couplers. In order to maximize the output signal, the lengths $l_i$ must be properly chosen, so that the various signal components corresponding to the M waveguides all contribute in phase, except for multiples of $2\pi J$ caused by the grating order. Most of the input power will then be transferred to the output port under consideration. Therefore, since negligible input power will be transferred to other ports, it will contribute negligible crosstalk. Furthermore, once the multiplexer is optimized for the central ports, it will perform efficiently, with negligible crosstalk, also from the other ports. This is a consequence the first condition of the correction scheme, which is now explained in greater detail.

Consider two particular ports of the multiplexer, the pth input port and the qth output port. The corresponding transmission coefficient is best derived, according to the Lorentz reciprocity theorem, by exciting the multiplexer from these two ports and determining the signals then produced in the M waveguides. The two sets of signals propagate in opposite directions. Furthermore, on the multiplexer symmetry line, the signals produced by exciting the qth output port are simply the complex conjugates of those produced by exciting the qth input port. Let $A_i, \phi_i$ denote the amplitudes and phases produced, on the symmetry line, by the p-th port. In order to obtain a perfect match (unity coupling) between the above two sets of signals at the wavelengths of maximum transmission, $A_i, \phi_i$ must essentially satisfy three conditions. First, $A_i$ must be independent of p. Second, the difference $\phi_i - \phi_{i-1}$ must vary linearly with p. Third, $\phi_i - \phi_{i-1}$ must be independent of i. The correction scheme simply insures to a good approximation these three conditions. Because of the last condition, maximum transmission is produced at the wavelengths for which $\phi_i - \phi_{i-1}$ is an integer multiple of $2\pi$. The other two conditions are satisfied, to a good approximation, by properly choosing the locations of the foci $F_1$ and $F_2$. In the absence of mutual coupling, the optimum locations are well-known. They are obtained by simply placing $F_1$ and $F_2$ at the boundaries of the free-space region. Also known is what will happen if this condition is not satisfied. Then, a displacement d of $F_1$ from the boundary will cause phase errors $$\phi_i - \phi_{i-1} \simeq kd\alpha'^2 \frac{2i-1}{2},$$

for $p=0$. It will also cause the normalized amplitudes $A_i/A_o$ to become functions of p. A similar result will be caused by a displacement of $F_2$ which will produce in $A_i$ an additional dependence on p. Such a multiplexer cannot be efficient from all ports. Now consider the effect of mutual coupling in a coupler having its foci located at the boundary of the free space region. By exciting the central waveguide, one will find that the wavefronts radiated in the free space region will not be centered at $F_1$. That is, their center of curvature will be displaced from the boundary, and the displacement will affect both $A_i$ and $\phi_i$. In order to correct these aberrations, which are a consequence of mutual coupling, the focus of each array must be displaced from the boundary, so that it coincides with the phase center of the other array. The optimum location of d is simply obtained by minimizing the above phase errors produced for p=0. The other focus $F_2$, on the other hand, must be chosen so that approximately the same $A_i$ are produced for all p. In practice, it will be sufficient to satisfy this condition for two particular values of p, those corresponding to the marginal ports.

The importance of the above conditions in the multiplexer design is illustrated in FIG. 2 showing the calculated wavelength response of an integrated $SiO_2/Si$ multiplexer optimized by this technique, compared to the response of a multiplexer that was not fully optimized. In the first fully optimized case, in order to obtain the desired response, the foci had to be displaced from the free space region by 350 μm. In the latter case, the displacement was reduced by 200 μm, to show the effect of mutual coupling. The free space region of each coupler in this example is assumed to have a length R of 1350 μm, the waveguides are strips of constant width $W=W'=5$ μm, with refractive index $n_1 \simeq 1.44$ separated by refractive index $n_2 \simeq n_1 - 0.003$ between the strips. The final gaps $t=t'$ between adjacent waveguides, at the circular boundaries of the free space regions, are 3 μm.

The above correction scheme is particularly important when N is large. Then, the angular separation $\alpha$ of the input waveguides becomes small, for a given angular width $\gamma'$ of the grating field of view. One can show that the phase errors $\phi_i - \phi_{i-1}$ produced for p=0 increase linearly with the length of the interaction region characterized by appreciable coupling between adjacent input waveguides. This length increases linearly with $1/\alpha$, for given values of W and W+t. It is then difficult to avoid mutual coupling between the waveguides of the input and output arrays, even if relatively large values of W and t are used. Furthermore, W cannot be chosen too large, since this could substantially increase the multiplexer dimensions, thus reducing substantially the largest N that can be realized for a given wafer size.

The above correction scheme has been described for the particular grating of FIG. 1. Clearly, however, the same scheme can be applied to a different grating. Then, crosstalk caused by mutual coupling between the input and output waveguides can be essentially removed by properly choosing the locations of the foci of the input and output waveguides, and by properly designing the grating so that it corrects (for instance by means of a suitable lens or reflector) the phase errors caused, by mutual coupling, over the grating aperture $M\alpha'$.

Once the multiplexer of FIG. 1 is optimized using the above correction scheme, it will demultiplex, in each period $\Lambda$ of its wavelength response, a total of N input channels. The spacing of the channels corresponding to a particular input port is determined by the output waveguide spacing. Similarly, the spacing of the N channels transferred to a particular output port is determined by the spacing of the input waveguides. Nonuniform spacing may be desirable for some applications, and this may be accomplished by properly designing the input and output arrays. The largest N that can be realized for a given M is obtained when the input and output waveguides are closely spaced. This will also minimize the multiplexer insertion loss, since it will maximize the efficiency of power transfer by each coupler. However, such a multiplexer will have an undesirable feature, its wavelength response will be afflicted by relatively high sidelobes, causing crosstalk at wavelengths different from those of maximum transmission. This is a consequence of the rectangular pattern of illumination approximately produced by the input waveguides, as explained above. The sidelobes can be substantially reduced, however, by using the following procedure. For this purpose, one must increase the width W and gap t of the input waveguides, thus reducing the value of N for a given M. The optimum width producing approximately the lowest sidelobes is approximately attained when the first two zeroes, or approximate zeroes, of the input array radiation pattern are approximately produced in the directions corresponding to the marginal waveguides of the grating. More precisely, one must produce approximately a cosine distribution, so that $$\sqrt{P_s/P_0} \simeq \cos(su)$$

and optimize the parameter u by substantially increasing the width W and the spacing W+t of the input waveguides, thus reducing N, so that $P_s \simeq 0$ for the marginal arms of the grating. One can show that this typically will reduce the first sidelobe of the wavelength response to a level of less than $-30$ dB, with respect to the main lobe. This level can be further reduced by modifying the radial arrays of the grating, by using nonuniform spacing, so as to slightly change the signal amplitudes $A_i$ produced in the grating waveguides. To optimally reduce the first sidelobe, one must first determine the wavelength corresponding to the peak of the first sidelobe, and then cause a sinusoidal perturbation $\delta A_i \simeq \delta A \cos(ci)$ with c properly chosen, so that the corresponding perturbation of the sidelobes is maximum at the peak of the first sidelobe. Then, by properly choosing the amplitude $\delta A$, the desired reduction will be obtained with minimal sacrifice in performance.

EXAMPLE 2

Described here is a design of another integrated $N \times N$ multiplexer capable of simultaneously multiplexing and demultiplexing a large number (up to about 50) of input and output wavelength channels. The multiplexer is a generalization of the $2 \times 2$ Mach-Zehnder multiplexer. It consists of two $N \times M$ star couplers connected by M paths of unequal length. Aberrations caused by mutual coupling in the waveguide arrays are minimized by a correction scheme that causes each star coupler to accurately perform a Fourier transformation. The multiplexer is useful as a wavelength routing device for long haul and local area networks.

The design of an $N \times N$ multiplexer is suitable for realization in integrated form for large N using the $SiO_2/Si$ technology described above. It comprises two star couplers connected by M uncoupled waveguides having unequal lengths $l_s$ forming a grating, as shown in FIG. 1. Each coupler is realized by using a planar arrangement of two confocal arrays of radial waveguides performing with efficiency approaching 100% under ideal conditions, when the waveguides have strong mutual coupling. Aberrations caused by mutual coupling are minimized by a correction scheme which causes each star coupler to accurately perform a finite Fourier transformation. It is possible, by using this scheme, to obtain good efficiency in the entire Brillouin zone of the grating, as demonstrated by experimental results. Such a multiplexer should be useful as a wavelength routing device, for both long haul and local area networks. Its input-output mapping allows the same wavelength to be applied simultaneously to any number of input ports, with the corresponding signals appearing at different output ports. Thus, by employing N tunable lasers, each capable of N wavelengths, the multiplexer can be used as an N×N switch.

The multiplexer of FIG. 1 is a symmetric arrangement of two identical couplers and a grating comprising M uncoupled waveguides with propagation constant $\beta$. The first coupler comprises two periodic arrays of radial waveguides with foci $F_1$ and $F_2$ and the second coupler comprises two periodic arrays of radial waveguides with foci $F_3$ and $F_4$. The waveguides are strips of constant refractive index $n_2$ separated by strips of refractive index $n_1$. Each focus $F_i$ is displaced (by d or d') from the circular boundary of the free-space region, which also is characterized by uniform refractive index $n_2$. The input power P supplied to the p-th port at a particular wavelength $\lambda$ is transferred to the grating with efficiency $\epsilon_p = (\Sigma P_s)/P$ where $P_s$ is the power in the s-th arm of the grating. For an optimized multiplexer, neglecting residual aberrations, the power transmission coefficient $T_{p,q}$ from the p-th input port to the q-th output port is $T_{p,q} = |\Sigma P_s \exp(j\phi_s)|^2/P^2$ where the phases $\phi_s$ are determined by the lengths $l_s$ of the grating arms. These lengths have been properly chosen so as to effectively produce a constant path length difference l between adjacent paths. Therefore, the difference $\phi = \phi_s - \phi_{s-1}$ is essentially independent of s, and one finds that $$\phi \simeq \beta l + kR(p-q)\alpha\alpha' \quad (1)$$

where $\alpha, \alpha'$ are the angular separations between the waveguides of the two arrays (of either coupler) and R is the focal length from $F_1$ to $F_2$. A simple relation is thus obtained between $T_{p,q}$ and the Fourier transform of $P_s$:

$$T_{p,q} = \epsilon_p \epsilon_q |h(\phi)|^2 \quad (2)$$

where $$h(\phi) = [\Sigma P_s \exp(js\phi)]/(\Sigma P_s). \quad (3)$$

The above relation assumes that the multiplexer is entirely free of aberrations. Then, the multiplexer efficiency, given by the largest value of $T_{p,q}$, is just the product $\epsilon_p \epsilon_q$ of the efficiencies of the two couplers. This can be justified as follows. According to Lorentz reciprocity theorem, the transmission coefficient $T_{p,q}$ is determined by the coupling coefficient between two supermodes, produced in the grating (in opposite directions) by exciting the two ports p and q. By then assuming a perfect match (unity coupling) between the two modes, one obtains $T_{p,q} = \epsilon_p \epsilon_q$. This, however, requires two conditions. First, the total optical path $\phi_s$ between the two ports p and q must be independent of s. Second, the relative powers $P_s/P_0$ must be independent of p,q. These conditions can be realized to a good approximation by optimizing the locations of the foci $F_i$ described above.

Consider, in the grating, the signals produced for p=0 on a reference circle centered at $F_1$. Mutual coupling between the input waveguides will affect the phases of these signals. It will cause phase errors $\delta\phi_s$, which must be minimized by optimizing the location of $F_1$. The optimum location of $F_1$ can be determined and it is called the phase center of the input array. Similarly, the optimum location of $F_2$ is the phase center of the second array. The optimum location of $F_3$ and $F_4$ with respect to the waveguide arrays connected to the other coupler are similarly determined. One can show, once the two foci of each coupler are properly optimized, that each coupler becomes approximately equivalent to a confocal arrangement of two arrays without mutual coupling between the waveguides of each array and, as a consequence, one obtains approximately Eqs. (1-3). Although aberrations will be substantially reduced, they will not be entirely eliminated, however, by simply optimizing the two foci. These residual aberrations may be reduced by properly choosing the lengths $l_s$. The above conditions, optimizing respectively the two foci and the lengths $l_s$, comprise the most complete correction scheme. In general, a multiplexer with its foci displaced from their optimum locations, will have aberrations, reducing efficiency and increasing crosstalk, as shown in one of the examples given later. One can show that a small longitudinal displacement of $F_1$ will cause $\delta\phi_s \simeq k\delta d(\alpha's)^2/2$. A displacement of $F_2$, on the other hand, will primarily affect the powers $P_s$. It will cause a lateral displacement $\delta x_p \simeq p\alpha\delta d'$ of the incident field illuminating the second array, thus causing $P_s$ to vary with p. There is a simple relation existing (approximately) between channel spacing $\Phi_0$, the total number N of channels in a period, and the focal length R. From eqs. (1-3), the transmission coefficient $T_{0,1}$ is displaced from $T_{0,0}$ by $\Phi_0 = kR\alpha\alpha'$. Furthermore, $h(\phi)$ is periodic with period $2\pi$ and, therefore, the total number of channels in a period is $\lambda/(R\alpha\alpha')$. This is also the total number of input waveguides in the central Brillouin zone of the grating. In fact, the angular width of this zone is $\lambda/(R\alpha')$ and, therefore, dividing it by the angular spacing $\alpha$, we obtain the desired result. Notice that N is not in general an integer, and it varies with $\lambda$.

Ideally, one would like the sidelobes of h to be very low and, at the same time, one would like N to be as large as possible, for a given M, so as to minimize the channel spacing, thus maximizing the total number of channels. The largest N is clearly M, and it can be realized efficiently by using efficient arrays, so that $P_s/P_0 \simeq 1$. Then for $N \simeq M$ $$h \simeq \sin(N\phi/2)/[N\sin(\phi/2)],$$

giving the smallest channel spacing, which is then approximately equal to the channel width determined by the 3dB points of $|h|^2$. However, h in this case is afflicted by relatively high sidelobes. In order to substantially reduce them, one must increase the channel spacing by approximately a factor 1.7, and choose $M \simeq 2N$, as illustrated below.

Figure 3:
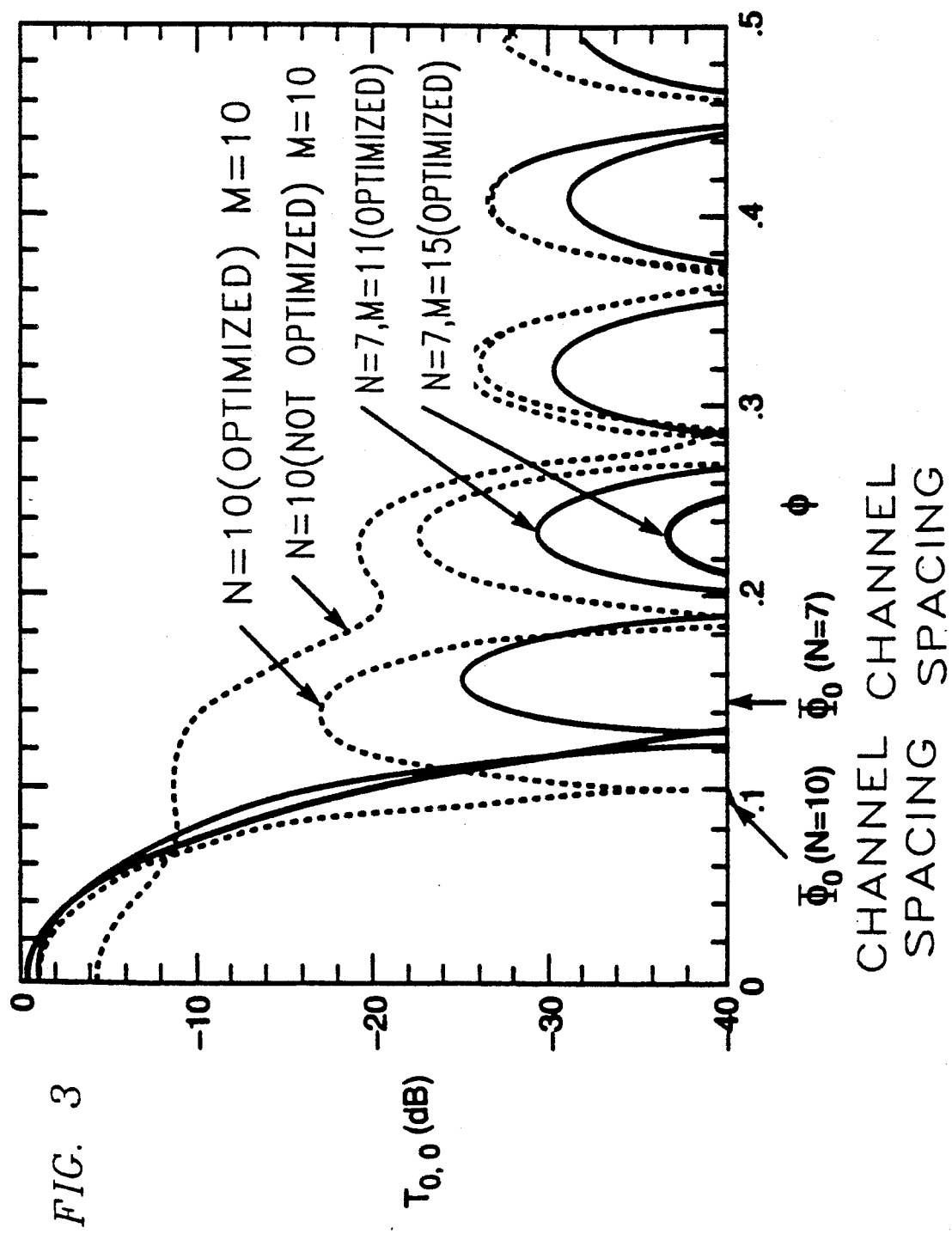
FIG. 3 is a graph showing the pattern of $T_{0,0}$ for a multiplexer optimized for $N=10$ and $M=11$ compared with a nonoptimized pattern. Also shown are the optimized patterns $T_{0,0}$ for $N=7$ and $M=11$ and 15.

Initially, let all arrays be designed efficiently by using $SiO_2/Si$ waveguides with cores of width $W \simeq 5$ μm and $\Delta n \simeq 0.003$. In the vicinity of the free space regions, assume gaps tof3 μm betweem the cores, and let design wavelength be $\lambda \simeq \lambda/n = 1.3$ μm. The number N of input waveguides in the central Brillouin zone of the grating is determined by the focal length R. In the following example we choose $R \simeq 1350$ μm, resulting in $N \simeq 10$. By calculating the input array radiation characteristics, by a propagating beam method, one can determine the amplitudes and phases in the various arms of the grating. By then optimizing the location of $F_1$ one finds that the displacement of each phase center from the free-space region is accurately given by $$\frac{d}{W}\tan\alpha \simeq 0.55$$

giving d≃350 μm for R=1350 μm. FIG. 3 shows the behavior of $T_{0,0}$ for a multiplexer optimized by the propagating beam method for N=10 and M=11. Also shown is the effect of reducing d by 200 μm. The resulting aberrations caused by mutual coupling distort the main lobe, reducing efficiency and increasing crosstalk.

Figure 4:
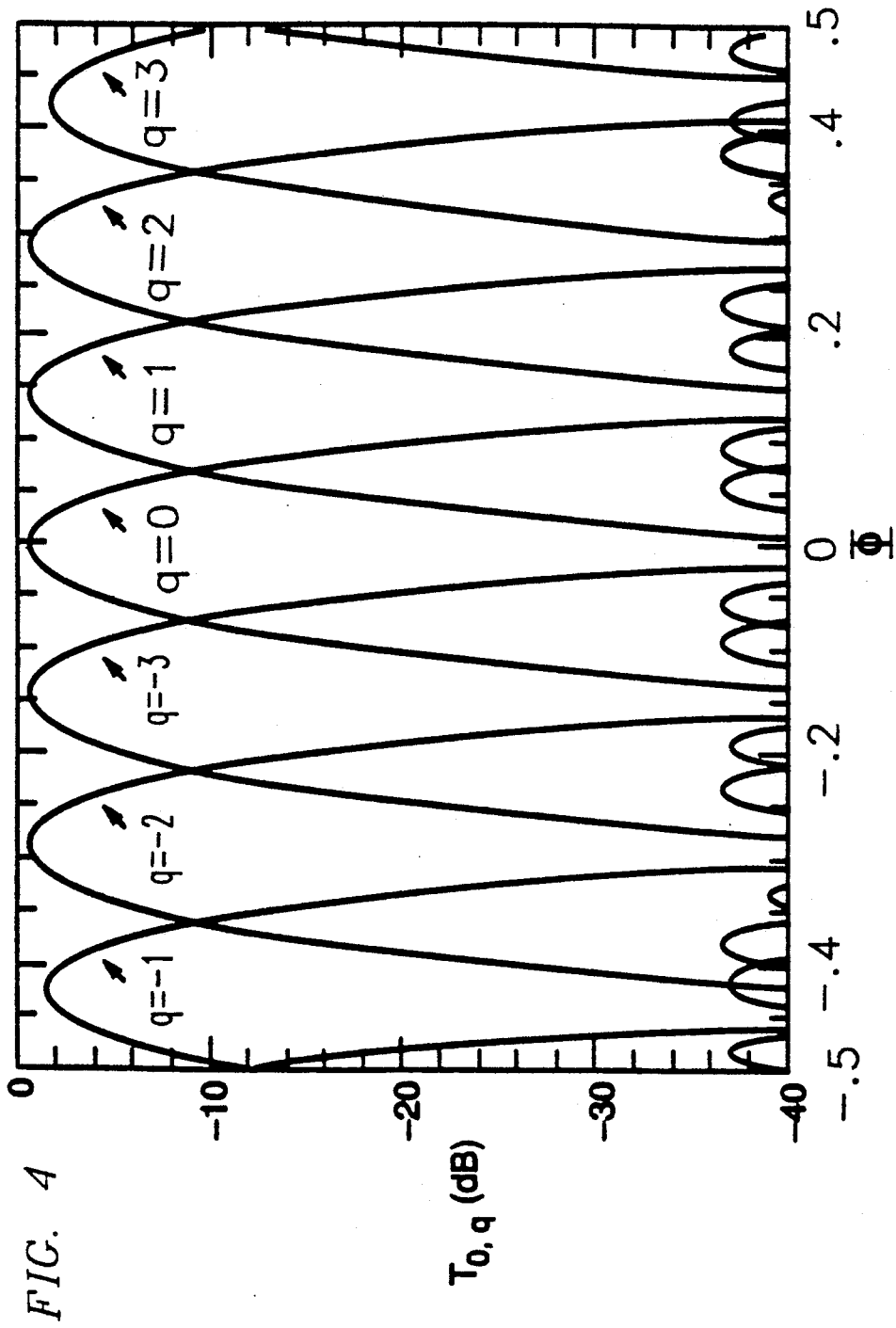
FIG. 4 is a graph showing the patterns $T_{0,q}$ for an optimized multiplexer with $N=7$ and $M=15$.

In the above example, the input array approximately produced the same power in each arm of the grating. We next produce approximately a cosine distribution, so that $$\sqrt{P_s/P_0} \propto \cos(su),$$

and optimize the parameter u by substantially increasing the width W and the spacing W+t of the input waveguides, thus reducing N. By reducing N from 10 to 7, and choosing W≃10 μm and t=6 μm, the sidelobes of h can be reduced to less than −25 dB as shown in FIG. 3. By also increasing M from 11 to 15, they can be further reduced to less than −36 dB, as illustrated in FIGS. 3 and 4. The channel spacing now exceeds by a factor 1.7 the channel width, and this can be shown to be (approximately) the smallest channel spacing obtainable with sidelobes appreciably lower than −30 dB. The behavior of $T_{p,q}$ was found to agree with Eqs (1-3), for all values of p,q. Hence, the wavelength dependence was approximately independent of p,q and the efficiencies for $\phi=0$ were accurately given by $$T_{p,q} = \sqrt{T_{0,p}T_{0,q}} \text{ with}$$

$T_{0,q}=0.944, 0.943, 0.927, 0.816,$ for $|q|=0,\ldots,3;$ showing that the multiplexer performs well in the entire central zone of the grating, i.e. in the entire free spectral range determined by the period of $h(\phi)$. Notice that the marginal efficiencies for the input and output ports corresponding to the edges of the above zone are substantially lower, as expected because of Bragg reflections.

The multiplexer performance of typical values of W and t have been discussed. A relatively small focal length R≃1350 μm has been chosen, resulting in N=7-10. Greater N will be obtained by choosing a larger R, since N increases linearly with R, for given values of W and W+t. However, aberrations also increase linearly with R, and this must be taken into account in the design. Then, for large N, mutual coupling between the input and output waveguides is difficult to avoid, even for large N, and the technique of correcting aberrations then becomes particularly important. The next example describes the measured performance of two multiplexers based on the above designs.

EXAMPLE 3

The performance of an integrated N×N multiplexer fabricated using SiO₂/Si waveguides was measured. The insertion loss for N=7 is typically lower than 2.5 dB and crosstalk is less than −25 dB. The multiplexer response is approximately periodic. In each period, the multiplexer accepts, from each input waveguide, a total of N channels, and it transmits efficiently each channel to a particular output port. Similarly, each output port receives N channels, one from each input port. Thus, the total number of channels that can be transmitted simultaneously is $N^2$, which requires only N optical frequencies.

Reported here is the measured performance of an integrated N×N multiplexer fabricated using SiO₂/Si waveguides. The multiplexer response is approximately periodic, with period Λ. In each period the multiplexer simultaneously multiplexes and demultiplexes a total of $N^2$ channels. Thus, each output port receives N channels, one from each input port. The same wavelength can be used simultaneously at all input ports, since the corresponding signals appear at different output ports. Thus, by employing N tunable lasers, each capable of cover N wavelengths, the multiplexer can be used as an N×N switch. Furthermore, unlike broadcasting star couplers, there is no 1/N splitting loss.

The multiplexer comprises of two identical star couplers combined with M waveguides acting as a grating between the two couplers, as shown in FIG. 1. When operated from a particular input port, it performs as an ordinary 1×N demultiplexer. It differs, however, from previous designs, because of its good performance in the entire period Λ. This is obtained by using the correction scheme described above to minimize aberrations caused by mutual coupling between adjacent waveguides in the various arrays. Several integrated multiplexers, with N=7 and N=11 have been fabricated, and their measured performance agree well with calculations based on the propagating beam method mentioned above. For N=7, the total insertion loss, from input to output fiber, is typically lower than 2.5 dB. Crosstalk is typically less than −25 dB. It is expected that similar results will be obtained for larger N. The multiplexer should, therefore, be useful as a wavelength routing device, for both long haul and local area networks, and perhaps also for packet switches.

The multiplexer comprises two identical star couplers combined with M waveguides forming a grating between the two couplers, as shown in FIG. 1. Each coupler consists of a dielectric slab forming a free-space region between two periodic arrays of radial waveguides, which emanate from the virtual foci $F_i$. In the vicinity of the free-space region, the waveguides are closely spaced. As a consequence, mutual coupling between adjacent waveguides causes aberrations, which affect the coupler transmission matrix, and must be minimized by using the previously noted correction scheme. To this purpose, the foci of each coupler must be optimized by properly choosing their distance d,d' from the free-space region. The optimum d, for instance, is obtained by exciting the central port of the first coupler, and then minimizing the calculated phase errors produced, in the grating arms, on a reference circle centered at $F_1$. After minimizing the phase errors caused by the two couplers, residual phase errors may be further reduced by optimizing the lengths $l_s$ of the grating arms. Notice, because of this, the optimized grating is not exactly characterized by a constant difference $l_s - l_{s-1}$ throughout the grating.

The multiplexer operates as follows: The input signal supplied to the p-th port is radiated in the free-space region, and most of its power is accepted by the grating. Some of this power is then transferred by the second coupler to the q-th output port. The purpose of the grating is to provide a constant path length difference $l \simeq l_s - l_{s-1}$ between adjacent paths connecting the two couplers. This causes a difference in phase $\phi = \beta l$ that increases with the propagation constant $\beta \simeq 2\pi/\lambda$. Hence, it causes the power transmission coefficient $T_{p,q}$ to essentially vary periodically with $1/\lambda$, producing peaks of maximum transmission at the wavelengths for which $\phi$ is an integer multiple of $2\pi$. Here, we show that it is possible, by using the correction scheme of this application, to obtain improved performance in the entire period $\Lambda$ (the free spectral range determined by l).

The above scheme insures a good match between the two couplers at the wavelengths of maximum transmission. Thus, the multiplexer efficiency becomes, to a good approximation, the product of two quantities, the efficiencies $\epsilon_p$ and $\epsilon_q$ of the two couplers. One of these, $\epsilon_p$, is the fraction of the input power that is transferred to the grating. Similarly, by reversing the sense of transmission, $\epsilon_q$ is the efficiency of power transfer from the q-th port to the M waveguides of the grating. The product $\epsilon_p \epsilon_q$ is approximately the multiplexer efficiency $\epsilon_{p,q}$ corresponding to the maximum value of $T_{p,q}$. The wavelength dependence of $T_{p,q}$ is specified by the Fourier transform of the coefficients $C_s = P_s/P_0$, where $P_s$ denotes the power transferred from the p-th input port to the s-th waveguide of the grating. As a consequence, the main properties of $T_{p,q}$, such as the width of the main lobe and the level of the sidelobes, are determined by the radiation characteristics of the input array. Hence, they are determined by the width W and the spacing W+t of the input waveguides. As discussed above, the design producing efficiently the narrowest response and the smallest channel spacing is obtained by using an input array with strongly coupled waveguides, arranged with minimal gaps t. This will maximize the number of channels (for a given grating) but it will also produce relatively high sidelobes. In order to reduce these sidelobes, one must reduce N. Here, we describe the measured performance of two multiplexers designed using two different approaches, by maximizing N using closely spaced waveguides in one case and, in the other case, by minimizing the sidelobes.

In the first case, the same values of W and t were chosen for all arrays. The cores had a constant width $W = W' = 5$ μm with gaps $t = t'$ with 3 μm between the cores in the vicinity of the free-space region. The cores were realized with a refractive index difference $\Delta n \simeq 0.0035$. The first design was characterized by N=11 and M=11. In case of N=11 and M=11, the distances between focal point F1 and boundary 18a, between focal point F2 and boundary 18b, between focal point F3 and boundary 24a, and between focal point F4 and boundary 24b were all 350 μm.

In the second design, the width and spacing of the input waveguides were increased by choosing N=7, $W \simeq 10$ μm and $t \simeq 6$ μm, thus substantially reducing the sidelobes. Several multiplexers having this value of N with values of M of 11, 13 and 15, were made. In the case of N=7 and M=11, 13, and 15, the distances between focal point F1 and boundary 18a and between focal point F4 and boundary 24b were both 20 μm. The distances in those three situations involving N=7 between focal point F2 and boundary 18b and between focal point F3 and boundary 24a were both 350 μm. The three multiplexers gave similar performance, but lower sidelobes were obtained for M=15. To simplify the discussion here, the performance obtained in two cases are shown, for N=11, M=11, $\Lambda \simeq 16.5$ nm and N=7, M=15, $\Lambda \simeq 23.1$ nm.

In both cases, the patterns of $T_{p,q}$ varied little with p,q, and the insertion losses were approximately given by $$\epsilon_{p,q} \simeq \sqrt{\epsilon_{0,p} \epsilon_{0,q}}.$$

Figure 5:
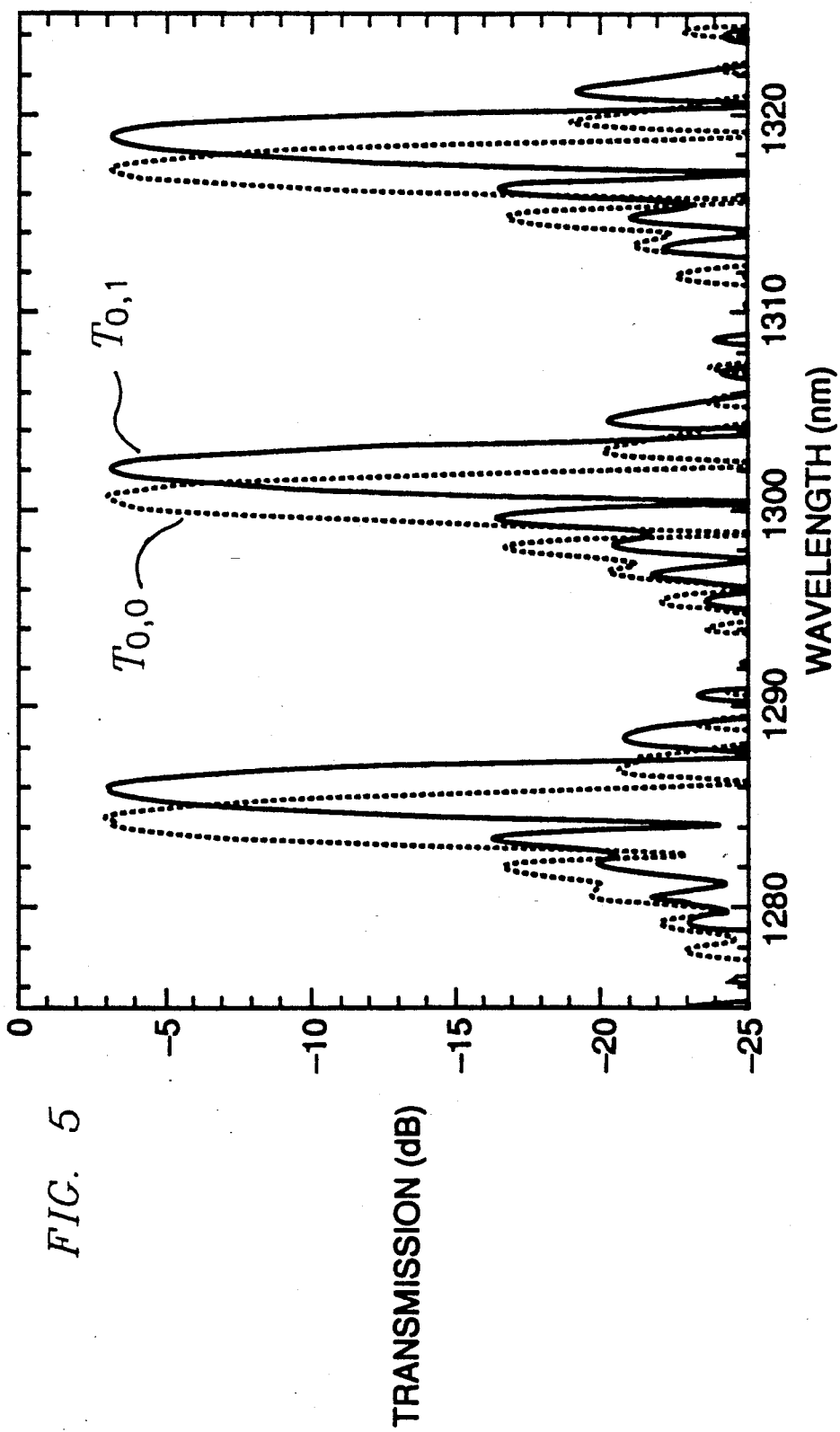
FIG. 5 shows measured TM transmission coefficient patterns $T_{0,0}$ and $T_{0,1}$ of an optimized $11 \times 11$ multiplexer. The channel spacing is 1.5 nm.
Figure 6:
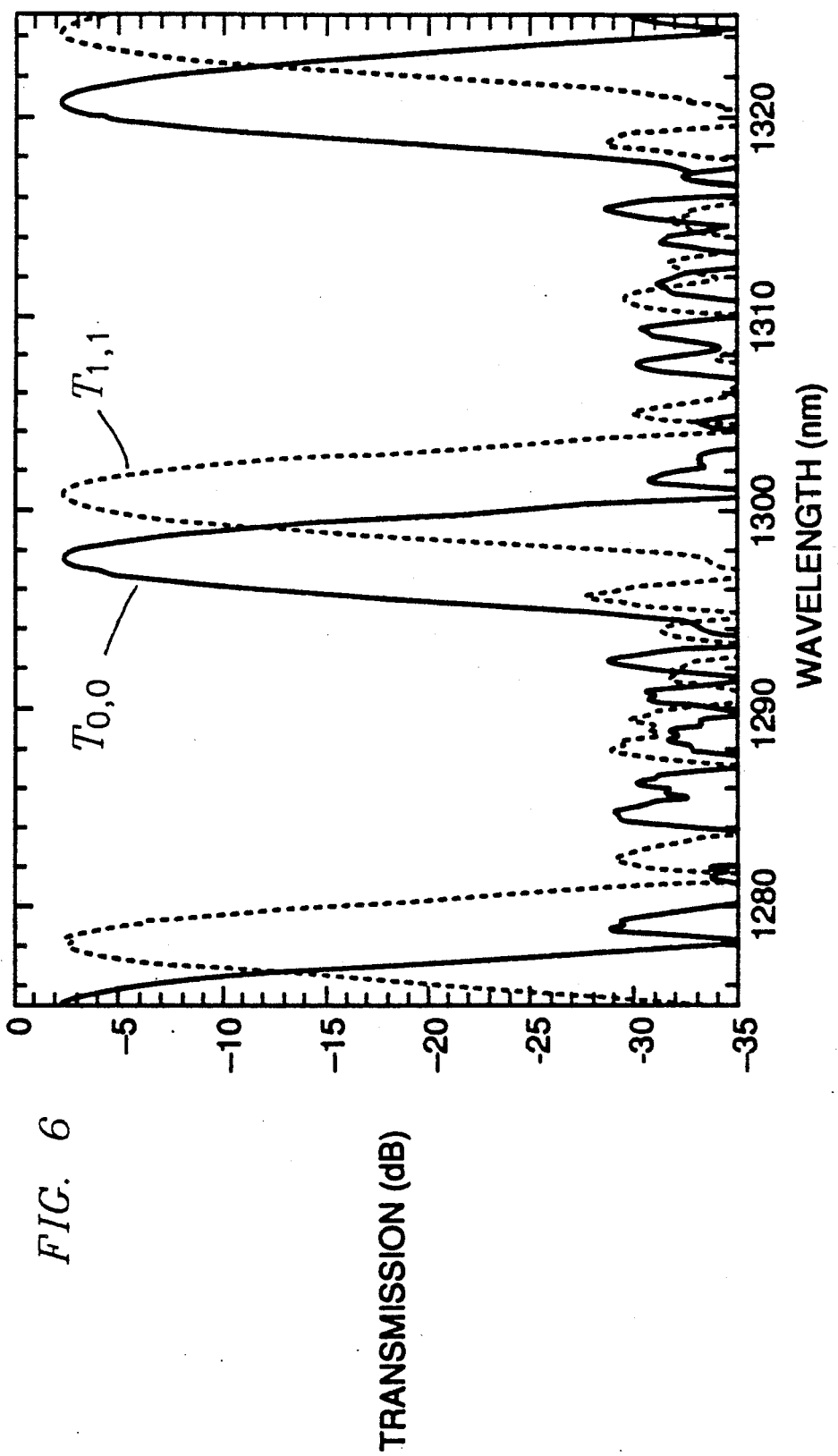
FIG. 6 shows measured TM transmission coefficient patterns $T_{0,0}$ and $T_{0,1}$ of an optimized $7 \times 7$ multiplexer. The channel spacing is 3.3 nm.
Figure 7:
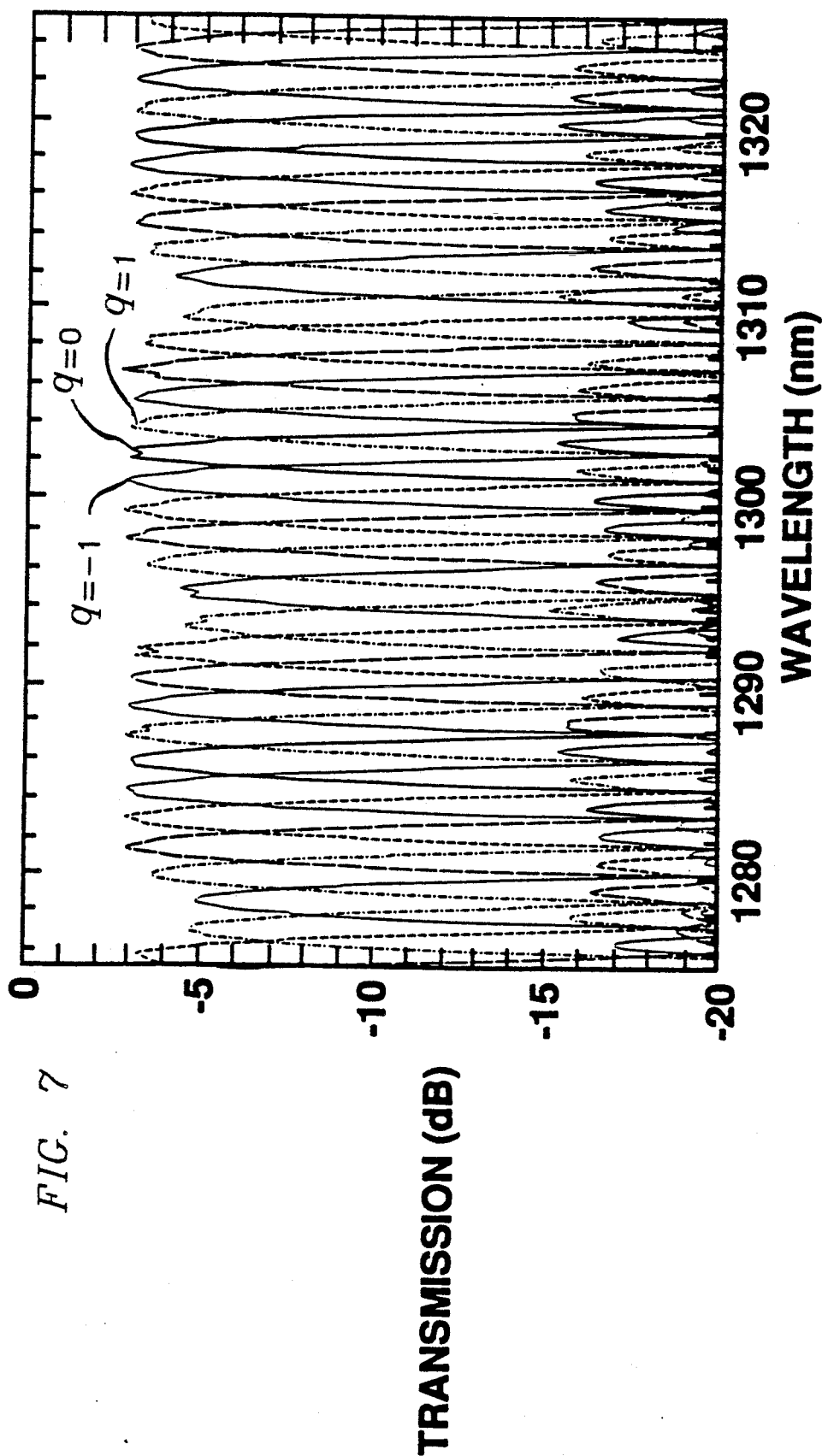
FIG. 7 shows measured TM transmission coefficient patterns $T_{0,q}$ of an optimized $11 \times 11$ multiplexer. The period $\Lambda$ is about 16.4 nm.
Figure 8:
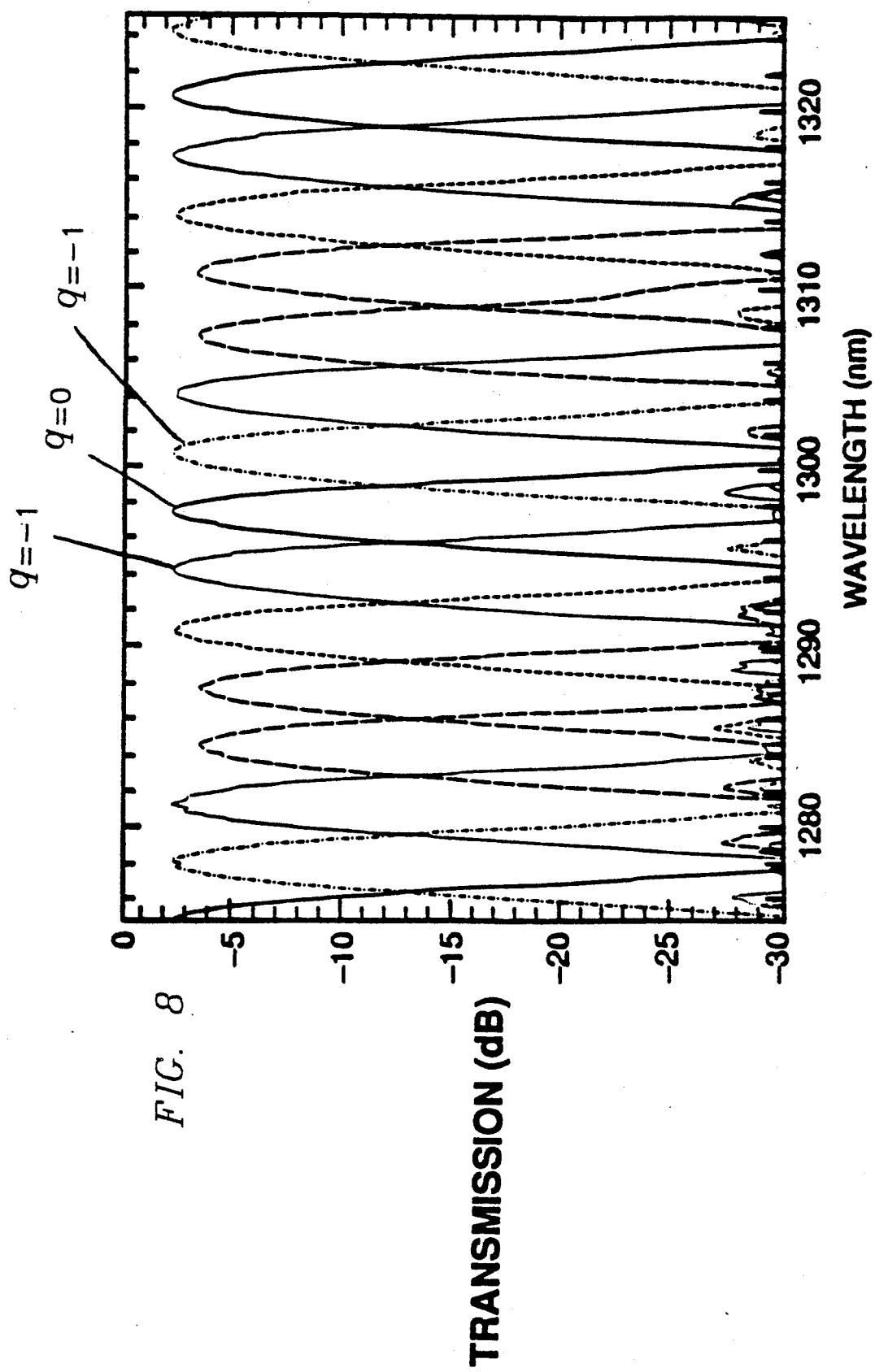
FIG. 8 shows measured TM transmission coefficient patterns $T_{0,q}$ of an optimized $7 \times 7$ multiplexer. The period $\Lambda$ is about 23.1 nm.

The channel spacing for N=11 was approximately equal to the channel width, and the patterns $T_{p,q}$ had relatively high sidelobes, as shown in FIG. 5 for TM polarization. For N=7, the sidelobes were much lower, less than $-25$ dB, and the ratio of channel spacing to channel width was increased by a factor 1.7, as shown in FIG. 6. All transmission coefficients were measured from input fiber to output fiber. They include about 0.7 dB caused by coupling losses of the fibers and bend losses. For N=7, the efficiency $\epsilon_{0,0}$ giving the insertion loss for TM polarization is about $-2.3$ dB, implying an excess loss of about $-1.7$ dB. The TE loss was higher, about $-2.5$ dB. Furthermore, strain birefringence shifted the transmission peaks for TE polarization by about 6 Å, without affecting the form of the patterns. FIGS. 7 and 8 show the patterns of $T_{p,q}$ for the central port p=0. For N=7, the measured insertion losses for p=0 are $$\epsilon_{0,q} = 0.58, 0.58, 0.57, 0.44, \text{for} |q| = 0,1,2,3.$$

For $p \neq 0$, the insertion losses $\epsilon_{p,q}$ are approximately given by $$\epsilon_{p,q} \simeq \sqrt{\epsilon_{0,p} \epsilon_{0,q}}.$$

The transmission coefficients $T_{p,q}$ for a multiplexer without aberrations are determined by the Fourier transform of the coefficients $P_s/P_t$, where $P_t$ denotes the total input power and $P_s$ is the power transferred to the s-th waveguide of the grating. The values of $P_s$ were measured by cleaving a multiplexer along the symmetry line, and these values were used to determine the multiplexer performance obtainable by removing all phase errors caused in the grating by residual aberrations. The results agreed well with the calculated patterns. In particular, for N=7, the sidelobes were lower than $-32$ dB. The higher sidelobes in FIG. 7 were primarily caused by phase errors, of less than $0.05\lambda$, which may be corrected by slightly modifying the lengths $l_s$.

The results described above demonstrate that it is possible, by using two star couplers, to realize an N×N multiplexer analogous to the 2×2 Mach-Zehnder interferometer. By using strongly coupled input and output waveguides, the channel spacing can be made to approach the channel width, and the response $T_{p,q}$ is then given approximately by $|\sin(N\phi/2)/[N\sin(\phi/2)]|^2$. The results obtained for N=7 show, furthermore, that the sidelobes of $T_{p,q}$ can be substantially reduced by choosing $M \simeq 2N$ and increasing the channel spacing by about a factor 1.7. An important feature of both designs, is that they make full use of the entire available field of view of the grating.

I claim:

1. An optical interconnection apparatus comprising:
   a first plurality of input waveguides radially directed from a plurality of input ports toward a first focal point;

a first star coupler having an input connected to the plurality of input waveguides;

a first plurality of ouput waveguides radially directed to a second focal point and connected to an output of the first star coupler;

an optical grating comprising a plurality of unequal length waveguides having inputs connected to the first plurality of output waveguides;

a second plurality of input waveguides radially directed to a third focal point and connected to outputs of the optical grating;

a second star coupler having an input connected to an output of the second plurality of input waveguides; and a second plurality of output waveguides radially directed from a plurality of output ports toward a fourth focal point and connected to an output of the second star coupler;

the first and second focal points being located predetermined distances from the first star coupler and the third and fourth focal points being located predetermined distances from the second star coupler.

2. The optical interconnection apparatus of claim 1, in which the predetermined distances of the focal points from the star couplers are such that phase errors are reduced.

3. The optical interconnection apparatus of claim 1, in which the predetermined distances of the focal points from the star couplers are such that aberrations caused by mutual coupling between waveguides is reduced.

4. The optical interconnection apparatus of claim 1, in which the input and output radially directed pluralities of waveguides each define respective phase centers;

the focal points of the input waveguides substantially coincide with the phase centers of the output waveguides; and the focal points of the output waveguides substantially coincide with the phase centers of the input waveguides.

5. The interconnection apparatus of claim 2, in which the difference in length between adjacent waveguides in the optical grating is not the same for all adjacent waveguides throughout the grating so as to reduce residual phase errors in the apparatus.

6. An optical interconnection apparatus, comprising:

a free space region of predetermined geometry;

a first array of waveguides radially directed toward a first focal point located a predetermined distance outside the free space region so as to reduce phase errors caused by mutual coupling between the waveguides in the first array;

a second array of waveguides radially directed toward a second focal point located a predetermined distance outside the free space region so as to reduce phase errors caused by mutual coupling between the waveguides in the second array; and an optical grating connected to the second array of waveguides and having a plurality of optical waveguides each having a predetermined length which differs from the predetermined lengths of the other waveguides in the grating, the length difference between two adjacent waveguides in the grating not being constant throughout the grating and the lengths of the waveguides in the grating being such that residual phase errors are reduced.

7. An optical transmission system, comprising:

a plurality of input ports at least one of which receives optical communication signals;

a plurality of output ports at least one of which transmits optical communication signals;

a first plurality of input waveguides radially directed from the plurality of input ports toward a first focal point;

a first star coupler having an input connected to the plurality of input waveguides;

a first plurality of output waveguides radially directed to a second focal point and connected to an output of the first star coupler;

an optical grating comprising a plurality of unequal length waveguides having inputs connected to the first plurality of output waveguides;

a second plurality of input waveguides radially directed to a third focal point and connected to outputs of the optical grating;

a second star coupler having an input connected to an output of the second plurality of input waveguides; and a second plurality of output waveguides radially directed from the plurality of output ports toward a fourth focal point and connected to an output of the second star coupler;

the first and second focal points being located predetermined distances from the first star coupler and the third and fourth focal points being located predetermined distances from the second star coupler so as to reduce phase errors caused by mutual coupling between the waveguides in the array of input and output waveguides.

8. The optical transmission system of claim 7, in which the optical grating comprises a plurality of optical waveguides each having a predetermined length which differs from the predetermined lengths of the other waveguides in the grating, the length difference between two adjacent waveguides in the grating not being constant throughout the grating and the lengths of the waveguides in the grating being such that residual phase errors are reduced.

* * * * *